United States Patent [19]

Kobayashi

[11] Patent Number: 4,845,004

[45] Date of Patent: Jul. 4, 1989

[54] FLUIDITY IMPROVER FOR POSITIVELY-CHARGING RESIN POWDER

[75] Inventor: Hideki Kobayashi, Ichihara, Japan

[73] Assignee: Toray Silicone Co., Ltd., Tokyo, Japan

[21] Appl. No.: 194,598

[22] Filed: May 16, 1988

[30] Foreign Application Priority Data

May 29, 1987 [JP] Japan ................................ 62-134625

[51] Int. Cl.[4] ........................ B32B 19/00; G03G 9/08

[52] U.S. Cl. ..................................... 430/110; 428/405

[58] Field of Search ........................ 430/110; 428/405

[56] References Cited

U.S. PATENT DOCUMENTS 4,600,677 7/1986 Hoffend et al. ..................... 430/110

4,640,882 2/1987 Mitsuhashi et al. ................. 430/110

FOREIGN PATENT DOCUMENTS 61-148454 7/1986 Japan .................................. 430/110

*Primary Examiner*—Roland E. Martin

*Attorney, Agent, or Firm*—Alexander Weitz

[57] ABSTRACT

There is disclosed a hydrophobic silica-type micropowder comprising silica-type microparticles which have been treated with certain secondary or tertiary amine-functional silanes. When the micropowder is combined with a positively-charging resin powder, such as a toner, the fluidity of the resin powder is substantially increased and this improved fluidity is retained upon long term storage.

15 Claims, No Drawings

FLUIDITY IMPROVER FOR POSITIVELY-CHARGING RESIN POWDER

The present invention relates to a fluidity improver for positively-charging resin powders, and, more specifically, relates to a fluidity improver which has the form of hydrophobic silica-type microparticles which will become positively charged when contacted and agitated with a magnetic powder such as powdered iron or powdered iron oxide.

BACKGROUND OF THE INVENTION

Silica-type micropowder has been used in a number of industrial fields in order to inhibit the solidification of powders and increase fluidity.

One such application concerns those resin powders whose use requires that they become electrostatically charged, such as the dry toners in electrophotographic copiers. In such cases, the charging properties of any additive are an important consideration. In recent years, this field has witnessed increased demand for positively-charging toner in conjunction with advances in the development of organic photosemiconductors, and it is thought desirable that any additive for improving the fluidity in this regard would itself be positively chargeable.

One method for obtaining such a positively-charging additive is the method disclosed in Japanese Patent Publication Number 53-22447 [22,447/78]. In Japanese Patent Publication Number 53-22447, an electrostatic developer is prepared by treating a metal oxide powder with an aminoalkylalkoxysilane. The present inventor carried out a detailed investigation of whether it would be useful to attempt to increase the fluidity of positively-charging resin powders through the treatment of silica-type microparticles with the aminoalkylalkoxysilanes exemplified in the aforementioned publication. However, the treated silica obtained as a result did not have good properties as a fluidity improver for positively-charging resin powders.

Thus, the obtained treated silica was in many cases hydrophilic, and, when added to a positively-charging resin powder, the fluidity declined in a short period of time due to moisture absorption. In other cases, while the treated silica was initially hydrophobic, moisture absorption nevertheless occurred during long-term storage due to an unsatisfactory hydrophobicity, and the fluidity again declined in conjunction with this.

Consequently, the present inventor directed his research toward the development of an excellent fluidity improver for positively-charging resin powders, and achieved the present invention as a result.

SUMMARY OF THE INVENTION

The object of the present invention is to introduce a fluidity improver which, when added to positively-charging resin powder, will provide a substantial increase in fluidity and, in addition, will maintain the improved fluidity for long periods of time. Said object is achieved by means of a fluidity improver having the form of hydrophobic silica-type microparticles which are prepared by treating silica-type microparticles with a silane having the general structural formula

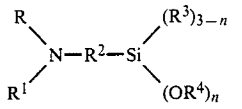

(I)

wherein, R is an alkyl group having 1 to 10 carbon atoms or a phenyl group and $R^1$ is the hydrogen atom or an alkyl group having 1 to 10 carbon atoms or a phenyl group. In formula (I), $R^2$ is an alkylene group having 1 to 6 carbon atoms, $R^3$ is an alkyl group having 1 to 10 carbon atoms or a phenyl group, $R^4$ is an alkyl group having 1 to 4 carbon atoms and n is 1 or 2, with the proviso that the sum of the number of carbons in groups R plus $R^2$ is at least 5 and $R^1$ is the hydrogen atom.

DETAILED DESCRIPTION OF THE INVENTION

Silica-type microparticles useful for the preparation of the fluidity improver of the present invention are, for example, fumed silica, silica aerogel, precipitated silica, and the composite microparticles (silica + another metal oxide) prepared from silicon tetrachloride and another metal halide such as aluminum trichloride, titanium tetrachloride and the like. Fumed silica is most preferred.

Considered from the standpoint of the properties as a fluidity improver for positively-charging resin powder, the silica-type microparticles preferably have a BET specific surface area of 130 to 400 m2/g. In order to increase the effects of treatment, the silica-type microparticles preferably contain a small quantity of water rather than being completely anhydrous. For this purpose, the silica-type microparticles preferably have a water content of 0.3 to 5 wt %. It is thought that the water accelerates the condensation reaction between the alkoxy groups in the silane under consideration and the silanol groups on the silica surface.

Such silica-type microparticles include the products available commercially under the following brandnames: Aerosil 130, Aerosil 200, Aerosil 300, Aerosil 380, Aerosil MOX80, and Aerosil MOX170 from Nippon Aerosil Kabushiki Kaisha (Japan); Cab-O-Sil M-5, Cab-O-Sil MS-7, Cab-O-Sil MS-75, Cab-O-Sil HS-5, and Cab-O-Sil EH-5 from Cabot Corporation (USA); and HDK N20, HDK V15, HDK T30, and HDK T40 from Wacker Chemie (West Germany).

With regard to the silane with general structural formula (I) which is used for the treatment of such silica-type micropowders, the alkyl groups which can comprise R are exemplified by methyl, ethyl, propyl, butyl, and decyl; the alkyl groups which can comprise $R^1$ are exemplified by the alkyl groups which can comprise R; $R^2$ is exemplified by ethylene, propylene, butylene, and hexylene; the alkyl groups which can comprise $R^3$ are exemplified by the alkyl groups which can comprise R; and $R^4$ is exemplified by methyl, ethyl, butyl.

The rationale for the sum of the number of carbons in R plus $R^2$ being at least 5 when $R^1$ is the hydrogen atom is that a sum not exceeding 4 provides a treated silica-type micropowder having such a low hydrophobicity that it is unsuitable as a fluidity improver.

When $R^3$ is too bulky, the alkoxy groups ($OR_4$) tend to be poorly reactive with the silica-type microparticles, and methyl and ethyl are preferred for $R^3$.

$R^4$ is preferably methyl or ethyl from the standpoint of reactivity with the silica-type microparticles.

The silane with general structural formula (I) becomes bonded to the silica-type microparticles via a condensation reaction between the alkoxy groups ($OR^4$) and silanol groups on the surface of the silica-type microparticles.

Each molecule in the case under consideration contains 1 or 2 alkoxy groups. Thus, in contrast to the aminoalkyltrialkoxysilane exemplified in Japanese Patent Publication Number 53-22447, it is unlikely that unreacted alkoxy groups or silanol groups (generated by hydrolysis of the alkoxy groups) will remain after treatment of the silica-type microparticles, which results in an increased hydrophobicity.

Furthermore, the amino group in the silane with general structural formula (I) is either a tertiary amino group of a particular type of secondary amino group. This results in an increased hydrophobicity from treatment of the silica-type microparticles, again in contrast to the primary amino group-containing aminoalkyl(methyl)dimethoxysilanes, primary amino group-containing aminoalkyltrialkoxysilanes, and secondary amino group-containing aminoalkyltrialkoxysilanes exemplified in Japanese Patent Publication Number 53-22447.

Silanes with general structural formula (I) are concretely exemplified by the following.

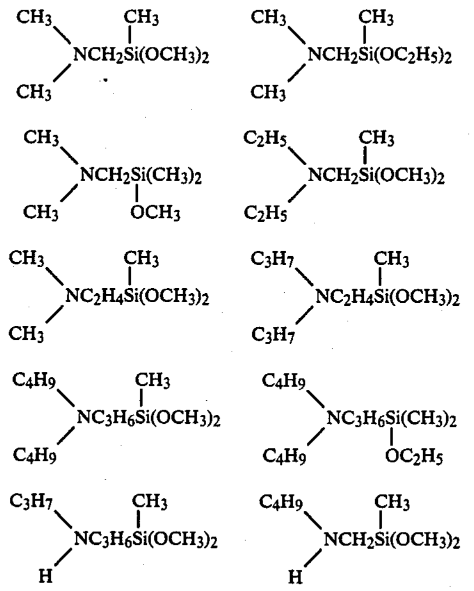

The quantity of use of said silane relative to the silica-type micropowder will vary with the number of silanol groups present per unit of surface area of the silica-type microparticles, with the specific surface area of the silica-type microparticles, with the alkoxy group content of the silane, etc., and so may not be specifically restricted. However, the range for this quantity will in general be 1 to 50 weight parts, preferably 10 to 40 weight parts, per 100 weight parts silica-type micropowder.

With regard to the hydrophobicization treatment of the silica-type micropowder using the silane under consideration, it is possible, for example, to add the silane to the silica-type micropowder, followed by mixing to homogeneity and then heating. It is also possible to add the silane (with mixing) to a heated silica-type micropowder. In the cases under consideration, because the instant silane has the proper hydrophobicity and does not have hydrogen bond-type interactions with the silica-type microparticles, a good dispersibility is obtained, and the hydrophobing treatment of the silica-type micropowder can be run without the use of solvent, (i.e., as a dry system). This is extremely advantageous from a production standpoint in that it is no longer necessary to use a wet system in which the silane is diluted with solvent and then added to the silica-type micropowder or the silica-type micropowder is slurried using solvent and the silane is then added.

The preferred temperature range during the above-mentioned heating is 100 to 200 degrees Centigrade. It is difficult to complete the reaction of the silica-type micropowder with the silane at below 100 degrees Centigrade, while exceeding 200 degrees Centigrade is uneconomical.

In the silane treatment of the silica-type micropowder, the joint use is also permissible of those silylating agents which are well-known as hydrophobing agents, for example, silazanes such as hexamethyldisilazane and tri(lower alkyl)alkoxysilanes, such as trimethylmethoxysilane, in order to block surface silanol groups.

When silica-type microparticles are treated with the silane under consideration using the preferred conditions as described above, they are converted into hydrophobic silica-type microparticles having a high degree of surface modification. Due to the presence of tertiary amine or hydrophobic secondary amine in this structure, it is positively-charging when contacted and agitated with a magnetic powder such as iron powder or iron oxide powder. This makes it entirely suitable as a fluidity improver for positively-charging resin powders which become positively charged under similar contact.

Such positively-charging resin powders are exemplified by toners, powdered anion-exchange resins, and powdered amino resins.

When 0.1 to 5 wt % fluidity improver of the present invention is added to toner, the toner will then exhibit a substantially improved fluidity. Examples of toners (finely divided to particle dimensions of 1 to 40 micrometers) are those consisting of a dye or pigment (e.g., carbon black) dispersed in a thermoplastic resin such as polystyrene or styrene/n-butyl methacrylate copolymer and single-component toners which contain magnetic particles such as magnetite. Furthermore, caking, which is caused by moisture absorption, will not appear even after long-term storage and the original excellent fluidity will be retained.

EXAMPLES

Examples and comparison examples of the present invention are provided below. In the examples and comparison examples, all parts and percentages are on a weight basis unless indicated to the contrary.

Test Methods (1) The powder fluidity and the fluidity of the mixture of powder plus fluidity improver were determined by measuring the angle of repose (i.e., the angle at which the powder starts to flow down an incline).

(2) The degree of hydrophobicity was determined as follows. Treated silica-type micropowder (0.2 g) was placed in a 100 ml beaker and 50 ml purified water was added (a satisfactorily hydrophobic silica-type micropowder floats on the liquid surface). Methanol was then added (introduced beneath the liquid surface) while stirring with a magnetic stirrer. The point at which silica-type micropowder was no longer observed on the liquid surface was designated as the end point. The degree of hydrophobicity was calculated using the following equation from the quantity of methanol required to the end point degree of hydrophobicity $(V/V\%)=X/((50+X))\times 100$ where $X$=methanol added in ml.

(3) The magnitude of contact charging with iron oxide powder was measured using a blow-off powder charge-quantity measurement device from Toshiba Chemical Products Company Limited (Japan).

Example 1

100 g fumed silica (specific surface area=200 m2/g, water content=2 wt %) was placed in a 5 liter separable flask, 20 g of the following silane was dripped in, and this was then mixed for 1 hour

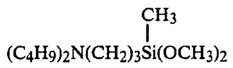

A hydrophobic fumed silica was prepared by heating to 150 degrees Centigrade with stirring under a nitrogen gas current until evolution of the methanol reaction by-product had ceased.

The obtained hydrophobic fumed silica gave a degree of hydrophobicity of 50% and a charge of plus 350 microcoulomb/g.

This hydrophobic fumed silica (0.3 parts) was then mixed in a Turbuler mixer (vessel-fixed type mixer for mixing powders at high speed) with 100 parts of a positively-charging toner having an average particle size of 20 micrometers and prepared from 93 wt % styrene/n-butyl methacrylate copolymer, 2 wt % nigrosine, and 5 wt % carbon black. An improved fluidity was observed, and the angle of repose declined from 52 degrees to 40 degrees.

This mixed powder was maintained at 25 degrees Centigrade/70% RH for 1 month: the angle of repose was then 41 degrees, or almost completely unchanged.

Example 2

100 g fumed silica (specific surface area=300 m2/g, water content=1 wt %) was placed in a 5 liter separable flask, 25 g of the following silane was dripped in, and this was then mixed for 1 hour

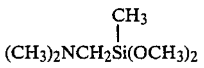

A hydrophobic fumed silica was prepared by heating to 110 degrees Centigrade under a nitrogen gas current with stirring until evolution of the methanol reaction by-product had ceased.

The obtained hydrophobic fumed silica gave a degree of hydrophobicity of 50% and a charge of plus 360 microcoulomb/g.

This hydrophobic fumed silica (0.7 parts) was then mixed in a Turbuler mixer with 100 parts toner as described in Example 1. An improved fluidity was again observed, and the angle of repose declined from 52 degrees to 40 degrees. This mixed powder was also maintained under the conditions as described in Example 1: the angle of repose was then 41 degrees, or almost completely unchanged.

Example 3

100 g fumed silica (specific surface area=300 m2/g, water content=1 wt %) was placed in a 5 liter separable flask, 20 g of the following silane was dripped in, and this was then mixed for 1 hour

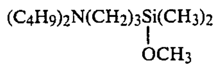

10 g hexamethyldisilazane was then dripped in, again followed by mixing for 1 hour. A hydrophobic silica was prepared by heating to 110 degrees Centigrade under a nitrogen gas current with stirring until evolution of the methanol reaction by-product had ceased.

The obtained hydrophobic silica gave a degree of hydrophobicity of 60% and a charge of plus 300 microcoulomb/g.

This hydrophobic silica (0.7 parts) was then mixed in a Turbuler mixer with 100 parts toner as described in Example 1. An improved fluidity was again observed, and the angle of repose declined from 52 degrees to 39 degrees. This mixed powder was also maintained under the conditions as described in Example 1: the angle of repose was then 41 degrees, or almost completely unchanged.

Example 4

100 g fumed silica (specific surface area=200 m2/g, water content=2 wt %) was placed in a 5 liter separable flask, 20 g of the following silane was dripped in, and this was then mixed for 1 hour

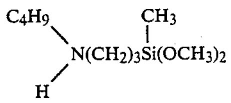

A hydrophobic fumed silica was prepared by heating to 150 degrees Centigrade and stirring under a nitrogen gas current until evolution of the methanol reaction by-product had ceased.

The obtained surface-modified silica gave a degree of hydrophobicity of 45% and a charge of plus 380 microcoulomb/g.

This hydrophobic silica (0.7 parts) was then mixed in a Turbuler mixer with 100 parts toner as described in Example 1. An improved fluidity was again observed, and the angle of repose declined from 52 degrees to 41 degrees. This mixed powder was also maintained under the conditions as described in Example 1: the angle of repose was then 42 degrees, or almost completely unchanged.

Comparison Example 1

A surface-modified silica was prepared by the procedure as described in Example 1, but using 20 g of the following silane in place of the silane in Example 1.

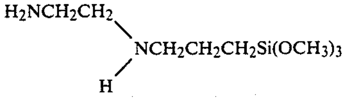

This material gave a charge of plus 300 microcoulomb/g and a degree of hydrophobicity of 0%.

This surface modified silica (0.7 parts) was mixed in a Turbuler mixer with 100 parts toner as described in Example 1: the angle of repose was reduced from 52 degrees to 45 degrees. This mixed powder was also maintained at 25 degrees Centigrade/70% RH for 1 month: the angle of repose was then 50 degrees, an increase of 5 degrees.

Comparison Example 2

A surface-modified silica was prepared by the procedure as described in Example 1, but using 20 g of the following silane in place of the silane in Example 1.

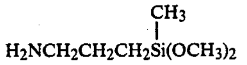

This material gave a charge of plus 300 microcoulomb/g and a degree of hydrophobicity of 10%.

This surface modified silica (0.7 parts) was mixed in a Turbuler mixer with 100 parts tonèr as described in Example 1: the angle of repose was reduced from 52 degrees to 45 degrees. This mixed powder was also maintained at 25 degrees Centigrade/70% RH for 1 month: the angle of repose was then 48 degrees, an increase of 3 degrees.

That which is claimed is:

1. A composition comprising: hydrophobic silica-type microparticles prepared by the treatment of silica-type microparticles with a silane having the general formula

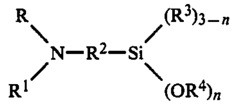

wherein R is selected from the group consisting of an alkyl group having 1 to 10 carbon atoms and a phenyl group, $R^1$ is selected from the group consisting of a hydrogen atom, an alkyl group having 1 to 10 carbon atoms and a phenyl group, $R^2$ is an alkylene group having 1 to 6 carbon atoms, $R^3$ is selected from the group consisting of an alkyl group having 1 to 10 carbon atoms and a phenyl group, $R^4$ is an alkyl group having 1 to 4 carbon atoms and n is 1 or 2, with the proviso that the sum of the number of carbons in groups R plus $R^2$ is at least 5 when $R^1$ is hydrogen.

2. The composition of claim 1, wherein $R^3$ and $R^4$ are each selected from the group consisting of methyl and ethyl groups.

3. The composition of claim 2, wherein R is an alkyl group having 1 to 4 carbon atoms and $R^1$ is selected from the group consisting of hydrogen and alkyl groups having 1 to 4 carbon atoms.

4. The composition of claim 1, wherein 1 to 50 parts by weight of said silane are used to treat 100 parts by weight of said silica-type microparticles.

5. The composition of claim 2, wherein 1 to 50 parts by weight of said silane are used to treat 100 parts by weight of said silica-type microparticles.

6. The composition of claim 3, wherein 1 to 50 parts by weight of said silane are used to treat 100 parts by weight of said silica-type microparticles.

7. The composition of claim 4, wherein said silica-type microparticles are fumed silica.

8. The composition of claim 5, wherein said silica-type microparticles are fumed silica.

9. The composition of claim 6, wherein said silica-type microparticles are fumed silica.

10. The composition of claim 1, further comprising a positively-charging resin powder, said silane constituting from 0.1 to 5 percent by weight of the combination.

11. The composition of claim 2, further comprising a positively-charging resin powder, said silane constituting from 0.1 to 5 percent by weight of the combination.

12. The composition of claim 3, further comprising a positively-charging resin powder, said silane constituting from 0.1 to 5 percent by weight of the combination.

13. The composition of claim 10, wherein said positively-charging resin powder is a toner.

14. The composition of claim 11, wherein said positively-charging resin powder is a toner.

15. The composition of claim 12, wherein said positively-charging resin powder is a toner.

* * * * *